United States Patent [19]

Adams

[11] Patent Number: 5,379,414
[45] Date of Patent: Jan. 3, 1995

[54] SYSTEMS AND METHODS FOR FDC ERROR DETECTION AND PREVENTION

[76] Inventor: Phillip M. Adams, 1466 Chandler Dr., Salt Lake City, Utah 84103

[21] Appl. No.: 911,409

[22] Filed: Jul. 10, 1992

[51] Int. Cl.$^6$ .......................... G06F 11/34; H04L 1/18
[52] U.S. Cl. .................................... 395/575; 371/62; 371/32; 371/33; 395/275
[58] Field of Search ............... 371/62, 8.2, 9.1, 11.1, 371/11.3, 21.1, 28, 21.6, 37.1, 40.1, 68.1, 66, 32, 33, 34, 35, 48; 380/4, 24, 25; 395/425, 575, 400, 375, 550, 275

[56] References Cited

U.S. PATENT DOCUMENTS

| | | | |
|---|---|---|---|
| 3,908,099 | 9/1975 | Borbas et al. | 179/175.2 R |
| 4,942,606 | 7/1990 | Kaiser et al. | 380/4 |
| 4,996,690 | 2/1991 | George et al. | 371/37.1 |
| 5,093,910 | 3/1992 | Tulpule et al. | 395/575 |
| 5,212,795 | 5/1993 | Hendry | 395/725 |
| 5,233,692 | 8/1993 | Gajjard et al. | 395/325 |
| 5,237,567 | 8/1993 | Nay et al. | 370/85.1 |

OTHER PUBLICATIONS

NEC Electronics Inc., "IBM-NEC Meeting for uPD765A/uPD72065 Problem" (U.S.A., May 1987).
Intel Corporation, Letter to customers from Jim Sleezer, Product Manager, regarding FDC error and possible solutions (U.S.A., May 2, 1988).
Adams, Phillip M., Nova University, Department of Computer Science, "Hardware-Induced Data Virus," Technical Report TR-881101-1 (U.S.A., Nov. 14, 1988).
Advanced Military Computing, "Hardware Virus Threatens Databases," vol. 4, No. 25, pp. 1 & 8 (U.S.A., Dec. 5, 1988).
Intel Corporation, "8237A/8237A-4/8237A-5 High Performance Programmable DMA Controller" (U.S.A., date unknown).
Intel Corporation, "8272A Single/Double Density Floppy Disk Controller" (U.S.A., Date unknown).

*Primary Examiner*—Robert W. Beausoliel, Jr.
*Assistant Examiner*—Dieu-Minh Le
*Attorney, Agent, or Firm*—Berne S. Broadbent; Gary D. E. Pierce

[57] ABSTRACT

A system and method which provides a complete software implementation of a device driver that is capable of detecting an undetectable data corruption problem without hardware redesign and/or internal modification to an existing FDC. The approach taken consists of software DMA shadowing and use of a software decoding network which allows the implementation of the invention to require a small amount of memory and only degrade the performance of the computer system a minimal amount when floppy diskette write operations occur.

7 Claims, 5 Drawing Sheets

SYSTEMS AND METHODS FOR FDC ERROR DETECTION AND PREVENTION

BACKGROUND

1. The Field of the Invention

This invention relates to the detection and recovery procedure of an undetected Floppy Diskette Controller ("FDC") data error where data corruption occurs and, more particularly, to novel systems and methods implemented as a software-only device driver which eliminates the need for hardware redesign and/or fabrication of new FDCs.

2. The Background Art

Computers are now used to perform functions and maintain data which is critical to many organizations. Businesses use computers to maintain essential financial and other business data. Computers are also used by government to monitor, regulate, and even activate, national defense systems. Maintaining the integrity of the stored data is essential to the proper functioning of these computer systems, and data corruption can have serious (even life threatening) consequences.

Most of these computer systems include diskette drives for storing and receiving data on floppy diskettes. For example, an employee of a large financial institution might have a personal computer that is attached to the main system. In order to avoid processing delays on the mainframe, the employee may routinely transfer data files from the host system to his local personal computer and then back again, temporarily storing data on a local floppy diskette. Similarly, an employee with a personal computer at home may occasionally decide to take work home, transporting data away from and back to the office on a floppy diskette.

Data transfer to and from a floppy diskette is controlled by a device called a Floppy Diskette Controller ("FDC"). The FDC is responsible for interfacing the computer's Central Processing Unit ("CPU") with the physical diskette drive. Significantly, since the diskette is spinning, it is necessary for the FDC to provide data to the diskette drive at a specified data rate. Otherwise, the data will be written to the wrong location on the diskette.

The design of the FDC accounts for situations when the data rate is not adequate to support the rotating diskette. Whenever this situation occurs, the FDC aborts the operation and signals the CPU that a data underrun condition has occurred. Unfortunately, however, it has been found that a design flaw in many FDCs makes it impossible to detect all data underrun conditions. This flaw has, for example, been found in the NEC 765, INTEL 8272 and compatible Floppy Diskette Controllers. Specifically, data loss and/or data corruption can occur during data transfers to diskettes (or even tape drives and other media which employ the FDC), whenever the last data byte of a sector being transferred is delayed for more than a few microseconds. Furthermore, if the last byte of a sector write operation is delayed too long then the next (physically adjacent) sector of the diskette will be destroyed as well.

For example, it has been found that these FDCs cannot detect a data underrun on the last byte of a write operation to a sector of a diskette. Consequently, if the FDC is preempted during a data transfer (thereby delaying the transfer), and an underrun occurs on the last byte of a sector, the following occurs: (1) the underrun flag does not get set, (2) the last byte written to the diskette is made equal to the previous byte written, and (3) CRC is generated on the altered data. The result is that incorrect data is written to the diskette and validated by the FDC.

Conditions under which this problem may occur can be identified by simply identifying those conditions that can delay data transfer to the diskette drive. In general, this requires that the computer system be engaged in "multi-tasking" operation or in overlapped input/output ("I/O") operation. Multi-tasking is the ability of a computer operating system to simulate the concurrent execution of multiple tasks. Importantly, concurrent execution is only "simulated" because there is only one CPU, and it can only process one task at a time. Therefore, a system interrupt is used to rapidly switch between the multiple tasks, giving the overall appearance of concurrent execution.

MS-DOS and PC-DOS, for example, are single-task operating systems. Therefore, one could argue that the problem described above would not occur. However, there are a number of standard MS-DOS and PC-DOS operating environments that simulate multi-tasking and are susceptible to the problem. The following environments, for example, have been found to be prime candidates for data loss and/or data corruption due to the FDC: local area networks, 327x host connections, high density diskettes, control print screen operations, terminate and stay resident (TSR) programs. The problem has also been found to occur as a result of virtually any interrupt service routine. Thus, unless the MS-DOS and PC-DOS operating systems disable all interrupts during diskette transfers, they are also susceptible to data loss and/or corruption.

Perhaps the best way to demonstrate the FDC error is to simulate a great deal of system activity. In other words, make the computer system act as though it were performing a large number of complex tasks all at one time. The problem has accordingly been demonstrated in systems using MS/PC-DOS operating systems by means of a simple test program. First, a clock program is executed and becomes a TSR task having the responsibility of servicing the timer interrupt (Ox1C) and updating the time on the screen. Second, a MS/PC-DOS diskette program is executed which writes a sector to the diskette using the BIOS interface interrupt (Ox13) and then reads the sector back. Once the sector has been written and read back the data is compared to determine whether or not an undetected error has occurred. A running total of both detected and undetected errors can then be output to the display. The results of using such a test program on various machines was quite astonishing. For example, the IBM PS/2 series seemed most susceptible to the problem, with roughly a 30% undetected error rate.

The UNIX operating system is a multi-tasking operating system, and it is extremely simple to create an environment that can cause the problem. One of the more simple examples is to begin a large transfer to the diskette and place that task in the background. After the transfer has begun then begin to display (cat) the contents of a very large file. The purpose of the video access is to force the video buffer memory refresh logic on DMA channel 1, along with the video memory access, to preempt the FDC operations occurring on DMA channel 2 (which is lower priority than channel 1). This example creates the classic overlapped I/O environment and can force the FDC into an undetectable error condition. More rigorous examples could include the concurrent transfer of data to or from a network or tape drive using a high priority Direct Memory Access ("DMA") channel while the diskette transfer is active. Clearly, the number of possible error producing examples is infinite and very possible in this environment.

For all practical purposes the OS/2 operating system can be regarded as a UNIX derivative. In other words, OS/2 suffers from the same problems that UNIX does. There are, however, two significant differences between OS/2 and UNIX. First, OS/2 semaphores video updates with diskette operations in an effort to avoid forcing the FDC problem to occur. However, any direct access to the video buffer, in either real or protected mode, during a diskette transfer will bypass this safe-guard and render OS/2 in the same condition as UNIX. Second, OS/2 incorporates a unique command that attempts to avoid the FDC problem by reading back every sector that is written in order to verify that the operation completed successfully. This command is an addition to the MODE command (MODE DSKT VER=ON). With these changes, data loss and/or data corruption should occur less frequently than before, but it is still possible for the FDC problem to destroy data that is not related to the current sector operation.

There are a host of other operating systems that are susceptible to the FDC problem just like DOS, OS/2, and UNIX. However, these systems may not have an install base as large as DOS, OS/2 or UNIX, and there may, therefore, be little emphasis on addressing the problem. Significantly, as long as the operating system utilizes the FDC and services system interrupts, the problem can manifest itself. This can, of course, occur in computer systems which use virtually any operating system.

Some in the computer industry have suggested that the FDC problem is extremely rare and difficult to reproduce. Admittedly, the problem is often very difficult to detect during normal operation because of its random characteristics. The only way to visibly detect this problem is to have the FDC corrupt data that is critical to the operation at hand. There may, however, be many locations on the diskette that have been corrupted, but not accessed. Studies have recently demonstrated that the FDC problem is quite easy to produce and may be more common than heretofore believed.

Computer users may, in fact, experience this problem frequently and not even known about it. After formatting a diskette, for example, the system may inform the user that the diskette is bad, although the user finds that if the operation is performed again on the same diskette everything is fine. Similarly, a copied file may be unusable, and the computer user concludes that he or she just did something wrong. For many in this high-tech world, it is very difficult to believe that the machine is in error and not ourselves. It remains a fact, however, that full diskette back-ups are seldom restored, that all instructions in programs are seldom, if ever, executed, that diskette files seldom utilize all of the allocated space, and that less complex systems are less likely to exhibit the problem.

Additionally, the first of these FDCs were shipped over 10 years ago. The devices were primarily used at that time in special-purpose operations in which the FDC problem would not normally be manifest. Today, on the other hand, the FDCs are incorporated into general-purpose computer systems that are capable of concurrent operation (multi-tasking or overlapped I/O). Thus, it is within today's environments that the problem is most likely to occur by having one of the operations delay the data transfer to the diskette. The more complex the computer system, the more likely it is to have one activity delay another, thereby creating the FDC error condition.

In short, the potential for data loss and/or data corruption is present in all computer systems that utilize this type of FDC, presently estimated at about 25 million personal computers. The design flaw in the FDC causes data corruption to occur and manifest itself in the same manner as a destructive computer virus. Furthermore, because of its nature, this problem has the potential of rendering even secure databases absolutely useless.

Those skilled in the art have suggested various ways of addressing the FDC problem. Unfortunately, however, each of these prior solutions has significant associated costs, risks and/or disadvantages.

For example, perhaps the most desirable solution is to have the manufacturer of the FDC provide a new FDC that alleviates the problem. This approach is, however, only a partial solution since many of the current systems have the FDC soldered into a circuit board. It would, of course, entail significant effort and/or cost to remove the current FDC and replace it with a new one.

Add-on hardware devices have similarly been suggested which could detect the FDC error condition and force it to be acknowledged by the CPU. Like a new FDC, however, such devices are at best inconvenient to install and use and are thus unlikely to be used by many computer users.

In an effort to avoid the disadvantages of a hardware solution, some read back and verify programs, like the IBM OS/2 MODE command, have been developed and installed. Such programs typically require that the FDC device driver perform single-sector writes, read the previously written sector back into a sector buffer in the FDC device driver, and then compare the data that was supposed to be written to the floppy with the data contained in the readback buffer. This process is performed until all data compares properly.

There are a number of problems that occur when employing this detection and a recovery procedure. Three of the most important problems are: (1) the size of the FDC device driver grows due to sector readback buffers required; (2) unacceptable performance is encountered because each sector must be written, the diskette must then make a full revolution for the sector to be readback, and finally the readback buffer must be compared with the original data to determine the success or failure of the I/O operation (thus causing all diskette transfers to execute at roughly one-third their normal speed); and (3) this approach is only partially effective in eliminating the FDC problem since it does not account for the data corruption that can occur to the physically adjacent sector when data transfer is significantly delayed. In short, the write/read/compare approach does not adequately protect the data from being corrupted, it causes more memory to be utilized by the operating system, and it degrades performance of the floppy diskette to an intolerable level. As a result, this approach has likewise not generally been adopted.

BRIEF SUMMARY AND OBJECTS OF THE INVENTION

In view of the foregoing, it is a primary object of the present invention to provide a system and method for the detection and recovery procedure of an undetected FDC data error where data corruption occurs.

It is also an object of the present invention to provide a software-only device driver which eliminates the need for hardware redesign and/or fabrication of new FDCs.

In addition, it is an object of the present invention to provide a solution to an I/O controller's (FDC) defect using DMA shadowing.

It is a further object of the present invention to provide a system and method for the detection and recovery procedure of an undetected FDC data error which reduces system performance only a minimal amount during floppy write operations.

It is a still further object of the present invention to provide a solution to an I/O controller's (FDC) defect using variable processor speed DMA shadowing via a software decoding network.

Consistent with the foregoing objects, and in accordance with the invention as embodied and broadly described herein, a system and method are disclosed in one embodiment of the present invention as including a device driver that is capable of detecting an undetectable data corruption problem without hardware redesign and/or internal modification to an existing FDC. The approach taken consists of DMA shadowing and use of a software decoding network which allows the implementation of the invention to require a small amount of memory and only degrade the performance of the computer system a minimal amount when floppy diskette write operations occur.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 5, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Figure 1:
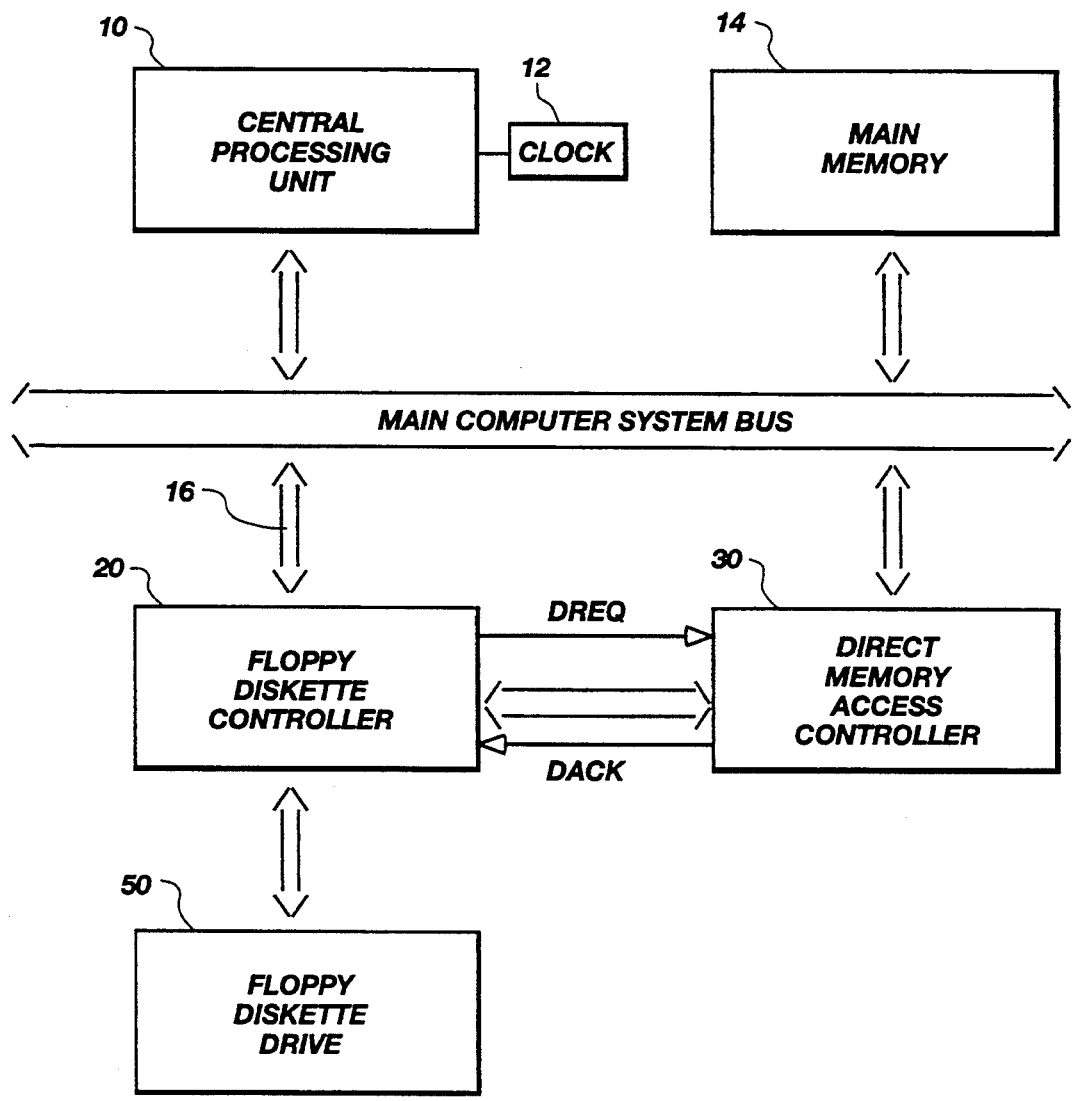
FIG. 1 is simplified block diagram which illustrates the architecture of most computer systems employing an floppy diskette controller (FDC)

The architecture of a typical computer system is illustrated in FIG. 1. The computer system's Central Processing Unit ("CPU") 10 and main memory 14 are located inside the system unit. The instructions and data used by the CPU 10 are kept in main memory 14 during computer work sessions. Main memory 14 is, however, not a permanent storage place for information; it is active only when the computer system is on. Thus, to avoid losing the data, it must be saved on some type of storage device. For example, the computer system may use a "hard disk" storage device which is permanently installed in the computer system. Most computer systems have at least one floppy diskette drive 50 that receives a removable floppy diskette. The floppy diskette likewise is used for "permanent" storage of data or software outside of the computer system and is especially useful for transferring data and information between separate computer systems.

In transferring data to a floppy diskette, the CPU 10 typically programs the Direct Memory Access ("DMA") controller 30 for an input/output ("I/O") transfer, issues a command to the Floppy Diskette Controller ("FDC") 20 to begin the I/O transfer, and then waits for the FDC to interrupt with a completion interrupt signal. It is also possible to perform Programmed I/O ("PIO") directly between the CPU 10 and the FDC 20 without involving the DMA controller 30, as illustrated by the broken arrows 16. This latter approach is seldom used; the majority of computer systems employ DMA I/O transfers to and from the floppy diskette. The invention will thus be described below with particular reference to the DMA controller 30. If PIO is employed, however, then the I/O transfer is totally controlled by the CPU 10 because the CPU is required to pass each and every data byte to the FDC 20. As a result, the "DMA shadowing" system and method of this invention can be directly applied to the PIO data stream because the CPU 10 already is controlling the I/O transfer, as will become more readily apparent from the discussion which follows.

Virtually all computer systems must have a system clock 12. The system clock is necessary when initiating an I/O transfer to the diskette drive 50 because one must not only control the data transfer, but also the drive motor. In this regard, it is important to know when the diskette drive motor has brought the diskette spin rate up to the nominal RPM required for the data transfer to be successful.

As an example, in IBM Personal Computers and compatibles, the system clock 12 interrupts the CPU 10 18.6 times per second (roughly once every 54 milliseconds). This interrupt is used to determine such things as diskette drive motor start and stop time. There are also a host of other time-dependent operations in the computer system that require this granularity of timing.

Figure 2:
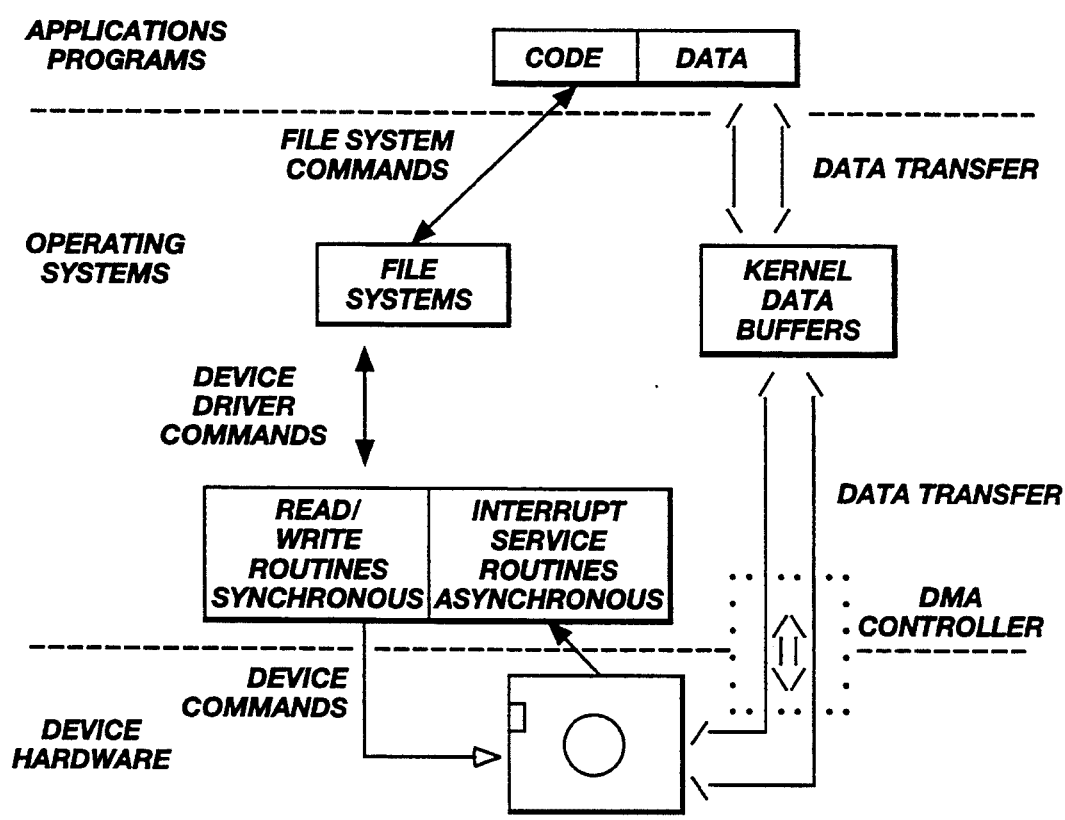
FIG. 2 is a block diagram which illustrates the typical association between application programs, operating systems, device drivers and computer system hardware (in this example, a floppy diskette)

The typical association between application programs, operating systems, device drivers and hardware is depicted in FIG. 2. The example presented is the floppy diskette.

Figure 3:
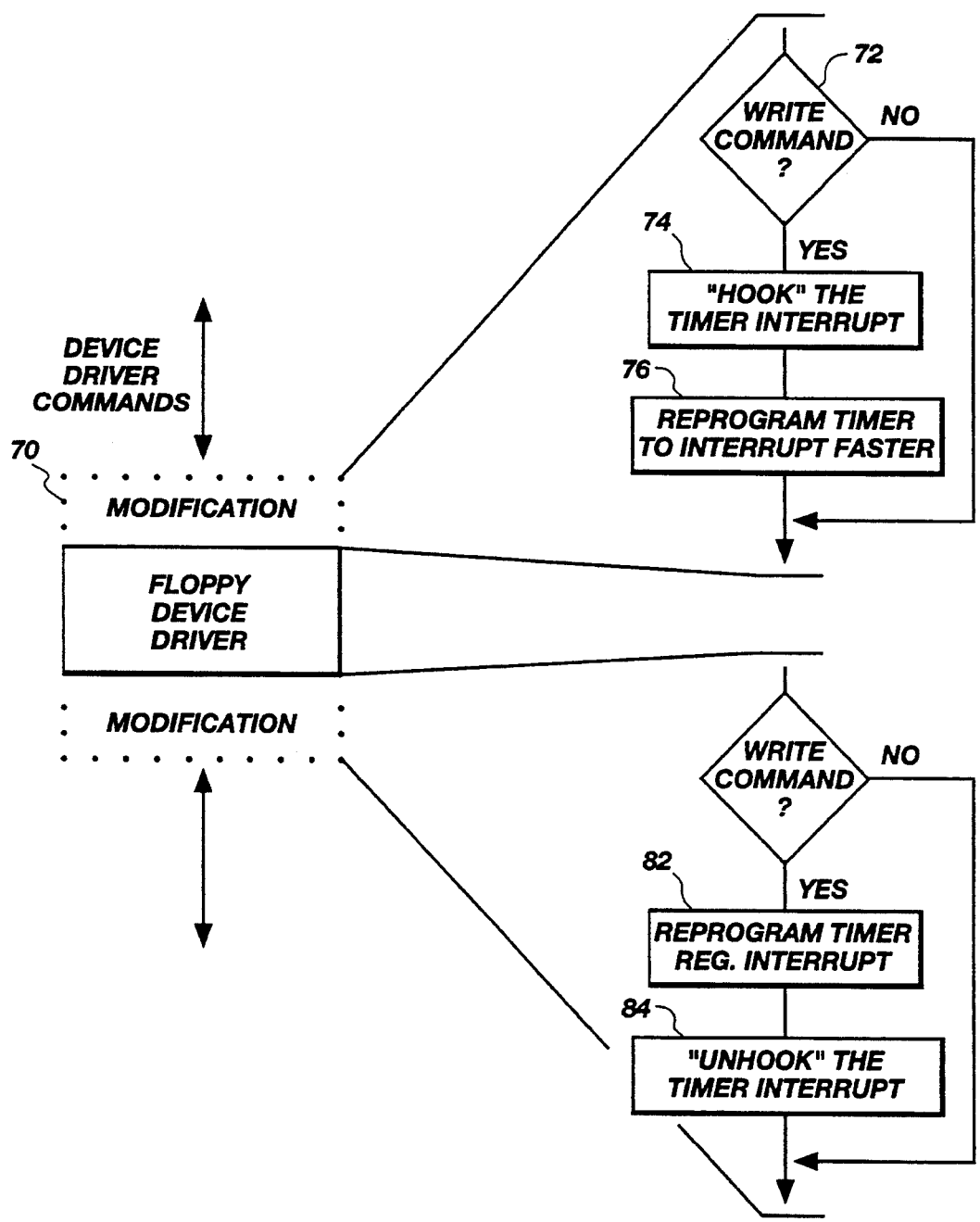
FIG. 3 is a flow chart depicting one presently preferred embodiment of the modifications that are applied to the diskette device driver in order to allow the error detection/prevention system and method of the present invention to be activated.
Figure 4:
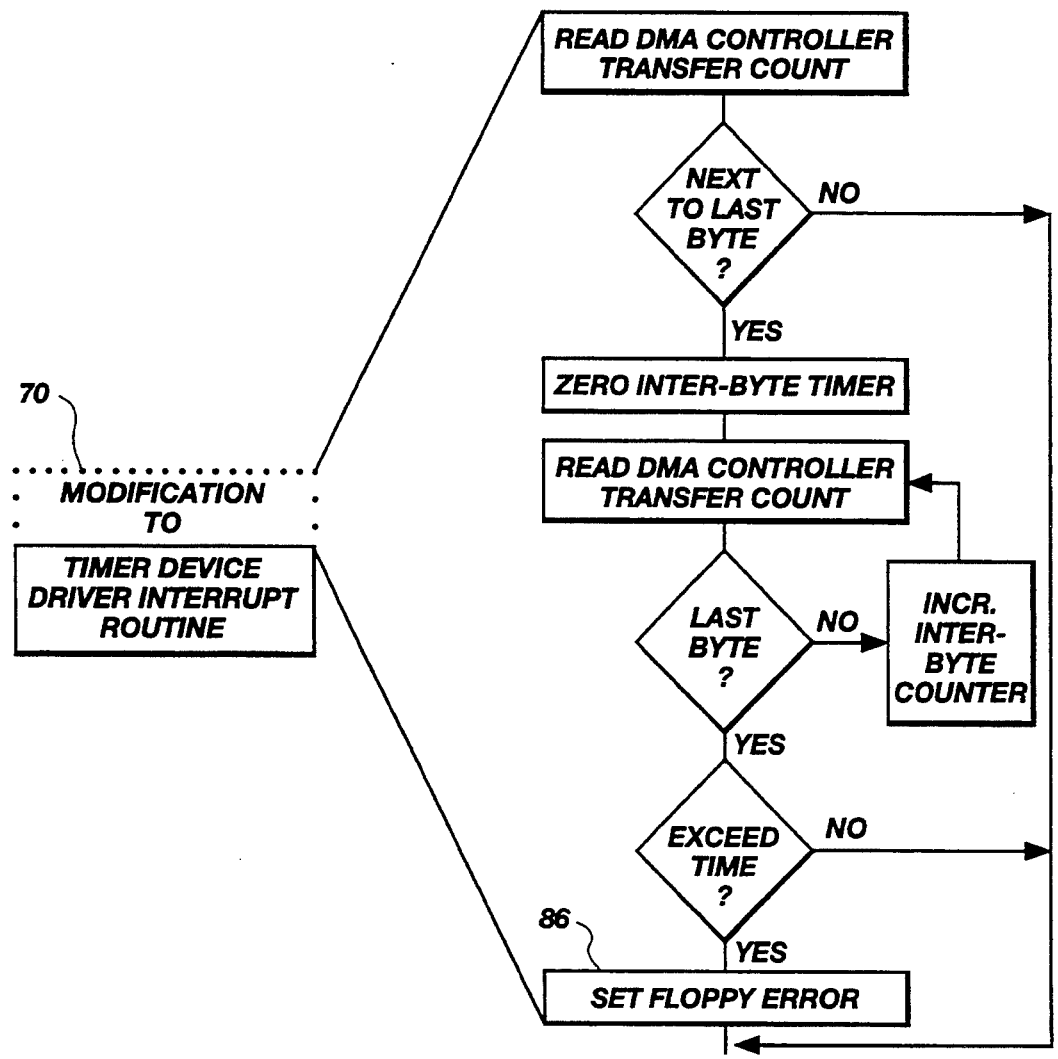
FIG. 4 is a flow chart depicting one presently preferred embodiment of the modifications that are made to the timer Interrupt Service Routine (ISR) so as to allow timing of the last byte's DREQ/DACK cycle in accordance with the present invention.
Figure 5:
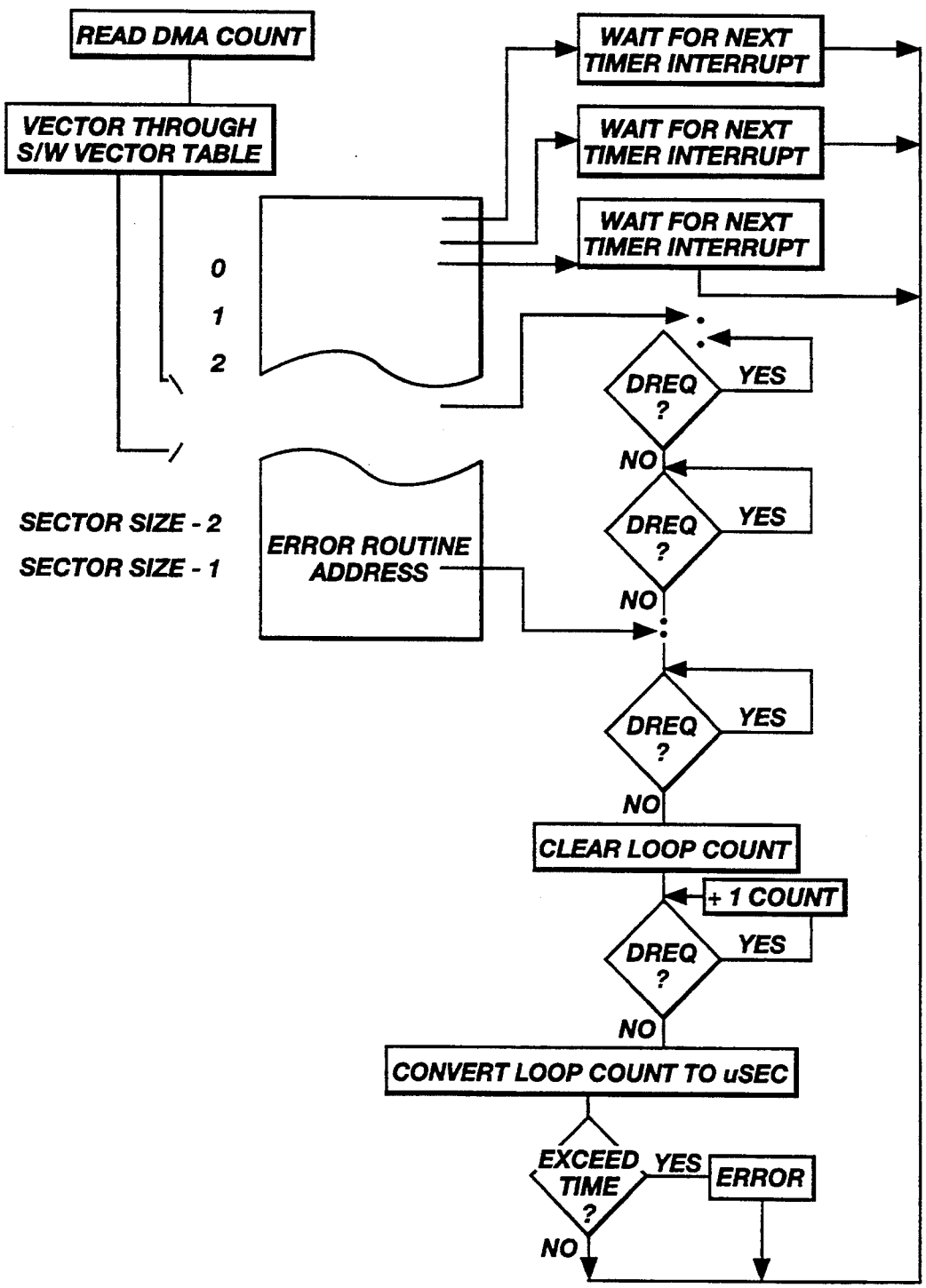
FIG. 5 is a flow chart depicting one presently preferred embodiment of a software decoding network (software vector-table) for use in connection with the error detection/prevention system and method of the present invention, the network having one code point/entry for each possible transfer byte in the sector.

As illustrated in FIGS. 3 and 4, the system and method of the present invention includes an interposer routine 70 which is placed between the application's request for floppy service and the current floppy device driver. The interposer routine 70 is actually a new or modified device driver that implements the detection and recovery for the undetected FDC data corruption. As shown, the interposer 70 first determines if the operation is a floppy diskette write operation (72). If so, the major function of interposer 70 is to insert itself between the application request for floppy service and the floppy device driver that will service the request. In the PC/MS-DOS environment, this can be accomplished by "hooking" the INT Ox13 interrupt vector (74) and directing it to the interposer routine and then reprogramming the timer to interrupt faster than normal (76) (e.g., every 4–7 milliseconds).

As will become more fully apparent from the discussion which follows, once a floppy write operation is detected, a software decoding network call vector is preferably installed (see FIG. 5), the current byte count is read, and DMA shadowing begins. If the time is too long, an error condition is forced (86). The system clock 12 is then reprogrammed (82) to interrupt normally (e.g., every 54 milliseconds), and timer interrupt is "unhooked" (84) until the next floppy write operation. Clearly, one could allow the timer to always interrupt at the accelerated rate and then check in the timer Interrupt Service Routine ("ISR") if a diskette write operation is active, but this approach is not as performance-minded as the one presented herein.

As used herein, "DMA shadowing" means monitoring byte transfers and then timing the last byte of a sector's DREQ to DACK signals. Importantly, there are, of course, a number of ways of determining when the DREQ is present and when the DACK is present. The sample code set forth below is only one approach. The present invention includes the use of any "DMA shadowing" whether the DREQ and DACK signals are detected at the DMA controller, CPU, system bus or FDC. This includes both explicit means, as presented in the sample code, and implicit means, such as inferring the state of the DREQ/DACK cycle from various components in the system that are triggered or reset from such signal transitions. A typical example is that the DACK can cause the Terminal Count (TC) signal to be asserted. Therefore, one can imply from the detection of TC that DACK has occurred.

In other words, whenever an application requests a floppy write operation, the system clock 12 is reprogrammed to interrupt every 4 to 7 milliseconds. Each time the system clock interrupts, the current byte count in the DMA controller transfer register (countdown register) is read. Once the byte counter has reached the last byte, the signal transition from DREQ to DACK is timed. If the time is greater than the time that will insure data integrity, an error condition is forced which is similar to the one the FDC hardware would produce if not defective. Finally, to avoid corruption to the adjacent sector the system causes the FDC to abort an operation if the timing between the DREQ and the DACK extends past the corruption point, but not to the adjacent sector destruction point, and return an error condition as previously described.

In order for the system to maintain proper operation, it is necessary that the interposer 70 save the original INT Ox13 contents (address of the original INT Ox13 Interrupt Service Routine) and invoke the original when necessary. Additional aspects of the interposer function are discussed below in connection with the other features of the device driver.

The following code fragment from the actual device driver demonstrates the interposer operation. This code fragment, together with the other sample code set forth herein, illustrates in more detail one preferred embodiment of a software routine derived from the block diagram of FIGS. 3 through 5. Those of ordinary skill in the art will, of course, appreciate that various modifications to the specific sample code may easily be made without departing from the essential characteristics of the invention. Thus, the illustrative code, and the accompanying description, is intended only as an example, and it simply illustrates one presently preferred embodiment that is consistent with the invention as claimed herein.

The examples set forth below relate to an implementation of the system and method of the present invention for use on an IBM Personal Computer running the PC/MS-DOS operating system. Similar versions have, however, been developed to operate in the UNIX and OS/2 environments. The invention is not limited to use with any particular operating system, and adaptations and changes which may be required for use with other operating systems will be readily apparent to those of ordinary skill in the art.

```
PROCEDURE:  _INT13_isr
REMARKS:    _INT13_isr is responsible for receiving the INT 13 diskette interrupts from
            the O/S (BIOS). A check is made to see if the requested operation is a
            WRITE and the drive is a diskette (0 or 1). If so, then the timer is enabled
            and the system is set-up to delay the last (512th) byte of the transfer to
            generate an undetected underrun/overrun condition.
_INT13_isr proc far
        mov     _TEXT : active, 0       ; Clear Diskette Write Active Flag
        mov     _TEXT : errors, 0       ; Clear Diskette Error Flag
        cmp     dl,2                    ; Check Drive Number for Diskette 0 or 1
        jb      chk_write               ; If Diskette, Then Check for Write
        jmp     _TEXT : int13_ptr       ; Otherwise, enter Original INT 13
chk_write:
        cmp     ah,3                    ; Check For Diskette Write Operation
        je      set_active              ; If Write, Then Diskette Write Active
        jmp     _TEXT : int13_ptr       ; Otherwise, Enter Original INT 13
```

-continued

```
set_active:
        push    ds                              ; Save DS Register
        mov     _TEXT : sectors,al              ; Save Number of Sectors to Transfer
        mov     _TEXT : track,ch                ; Save Track Number
        mov     _TEXT : sector,cl               ; Save Sector Number
        mov     _TEXT : head, dh                ; Save Head Number
        mov     _TEXT : drive,dl                ; Save Drive Number
        mov     _TEXT : active,0FFH             ; Set Diskette Write Active Flag
        call    NEAR PTR _Timer_enable          ; Enable Timer for "Shadowing" DMA
        pop     ds                              ; Restore DS Register
        pushf                                   ; Simulate An Interrupt
        call    _TEXT : int13_ptr               ; Enter Original INT 13 ISR
        pushf                                   ; Save INT 13 Flags
        call    NEAR PTR _Timer_disable         ; Disable the Timer "Shadow" Routine
        mov     _TEXT : active,0                ; Clear Diskette Write Active Flag
        popf                                    ; Restore INT 13 Flags
        cmp     _TEXT : errors,0                ; Were Errors Detected by Timer ISR
        jz      _INT13_exit                     ; If Zero, Then no Errors-Exit
        stc                                     ; Otherwise, Set Error Indicator
        mov     _TEXT : errors,0                ; And Clear Error Flag
_INT13_exit:
        ret     2                               ; Eliminate Entry Flags
_INT13_isr endp
```

The foregoing interposer routine checks to see if the request is a write operation. If so, then it calls _Timer_enable (reprogram the system clock), calls the original INT 0x13 Interrupt Service Routine (perform the actual write operation while DMA Shadowing is enabled), and finally calls _Timer_disable (reprograms the system clock to the original clock interrupt rate of approximately 54 milliseconds).

As mentioned above, the interposer invokes system clock management routines (_Timer_enable and _Timer_disable). These two functions provide the system clock to interrupt at an accelerated rate that is 8 to 10 times faster than normal. The disable routine (see FIG. 3) returns the system clock interrupt rate to the normal interrupt rate. Thus, they are inverse identities which make the system behave normally at all time without significant performance degradation (<10%) and only during floppy write operations. At any other time the performance is virtually unchanged.

The following code fragment depicts the operation of the _Timer_enable function (76):

```
PROCEDURE:  _TIMER_enable
REMARKS:    Timer enable is responsible for 1) moving INT 8 vector to INT 0 X 60, 2) Initializing
            INT 8 vector to _Timer_irs, and 3) Reprogramming the 8253 to
            interrupt 128 times faster. (Clock count * 0.840 Microseconds)
_Timer_enable proc  near
        pushf                                   ; Save Current Flags Register
        cli                                     ; Disable Interrupts
        push    ax                              ; Save AX Register
        push    bx                              ; Save BX Register
        push    es                              ; Save ES Register
        xor     ax,ax                           ; Zero AX Register
        mov     es,ax                           ; Set ES to Absolute Zero Segment
        mov     ax,es:[8*4]                     ; Obtain Offset of INT 8
        mov     bx,es:[(B*4)+2]                 ; Obtain Segment of INT 8
        mov     _TEXT : int8_off,ax             ; Move INT 8 Offset to INT 8 Offset
        mov     _TEXT : int8_seg,bx             ; Move INT 8 Segment to INT 8 Segment
        mov     ax,es:[1CH*4]                   ; Obtain Offset of INT 1C
        mov     bx,es:[(1CH*4)+2]               ; Obtain Segment of INT 1C
        mov     _TEXT : int1C_off,ax            ; Move INT 1C Offset to INT 1C Offset
        mov     _TEXT : int1C_seg,bx            ; Move INT 1C Segment to INT 1C Segment
        mov     _TEXT : ticks,0                 ; Zero ticks for Use by New ISR
        in      al,020H                         ; Obtain 8259 Interrupt Mask Register
        push    ax                              ; Save 8259 IMR for Restoration
        mov     al,0FFH                         ; Mask All External Interrupts At 8
        out     021H,al                         ; Set-up New 8259 IMR
        mov     al,36H                          ; Establish Operational Mode of 8253
        out     43H,al                          ; Program Operation of 8253
        jmp     $+2                             ; Allow Time for I/O to Complete Op
        mov     al,0                            ; Load LSB of Down Counter
        out     40H,al                          ; Send to 8253
        jmp     $+2                             ; Allow Time for I/O to Complete Op
        mov     al,02H                          ; Load MSB of Down Counter
        out     40H,al                          ; Send to 8253
        jmp     $+2                             ; Allow Time for I/O to Complete Op
        mov     ax,OFFSET _TEXT : _Timer_isr    ; Obtain the Offset of _Timer _isr
        mov     bx,cs                           ; Obtain the Segment of _Timer_isr
        mov     es:[8*4], ax                    ; Install new INT 8 Offset
        mov     es:[(8*4)+2],bx                 ; Install new INT 8 Segment
        mov     ax,OFFSET_TEXT : _INT1C_isr     ; Obtain the Offset of _INT_1C
        mov     bx,cs                           ; Obtain the Segment of _INT_1C
        mov     es: [1CH*4]ax                   ; Install new INT 1C Offset
  ;     mov     es:[(1CH*4)+2],bx               ; Install new INT 1C Segment
```

```
;       pop     ax                              ; Obtain old 8259 IMR from Stack
;       out     021H,al                         ; Set-up old 8259 IMR
Enable_exit:
        pop     es                              ; Restore ES Register
        pop     bx                              ; Restore BX Register
        pop     ax                              ; Restore AX Register
        popf                                    ; Restore Flags Register
        ret                                     ; Return to Caller
_Timer_enable endp
```

The foregoing _Timer_enable routine performs two major functions. First, this function "hooks" the interrupt vectors that are associated with system clock functions (INT Ox08 and INT Ox1C). The original values of these two interrupt vectors are saved for use in the newly installed interrupt service routines for these interrupts (_Timer_isr and _INT1C_isr). Next, the system cloak is reprogrammed to interrupt at the accelerated rate. However, now the system clock interrupts will be processed by the newly installed system clock interrupt service routines.

The following code fragment depicts the operation of the _Timer-disable function (82):

their original values and the system clock is reprogrammed to interrupt at its original frequency.

As depicted graphically in FIG. 4 and described further below, a _Timer-isr routine is used for servicing the accelerated interrupt rate of the system clock. The reason that the system clock interrupt rate is accelerated is that during a normal 512 byte data transfer (the typical sector size) 16 microseconds are required for each data byte to be transferred to the FDC (High Density Diskette Mode). Therefore, a typical Sector transfer requires 512 times 16 microseconds, or 8,192 microseconds. If the diskette is a low density diskette then the sector transfer time is doubled to 16,384 micro-

```
PROCEDURE:  _Timer_disable
REMARKS:    _Timer_disable is responsible for 1) Reprogramming the 8253 to
            interrupt 128 times slower and 2) Restoring the old INT 8
            interrupt vector from INT 60.
_Timer_disable proc   near
        pushf                                   ; Save Current Flags Register
        cli                                     ; Disable Interrupts
        push    ax                              ; Save AX Register
        push    bx                              ; Save BX Register
        push    es                              ; Save ES Register
;       in      al,020H                         ; Obtain 8259 Interrupt Mask Register
;       push    ax                              ; Save 8259 IMR For Restoration
;       mov     al,0FFH                         ; Mask All External Interrupts At 8
;       out     021H,al                         ; Set-up new 8259 IMR
        mov     al,36H                          ; Establish Operational Mode of 8253
        out     43H,al                          ; Program Operation of 8253
        jmp     $+2                             ; Allow Time for I/O to Complete Op
        mov     al,0                            ; Load LSB of Down Counter
        out     40H,al                          ; Send LSB to 8253
        jmp     $+2                             ; Allow time for I/O to Complete Op
        out     40H,al                          ; Send MSB to 8253
        jmp     $+2                             ; Allow time for I/O to Complete Op
        xor     ax,ax                           ; Zero AX Register
        mov     es,ax                           ; Set ES to Absolute Zero Segment
        mov     ax,_TEXT : int8_off             ; Obtain Offset of Original INT 8
        mov     bx,_TEXT : int8_seg             ; Obtain Segment of Original INT 8
        mov     es:[8*4],ax                     ; Install Old INT 8 Offset
        mov     es:[(8*4) +2], bx               ; Install Old INT 8 Segment
        mov     ax,_TEXT : int1C_off            ; Obtain Offset of Original INT 1C
        mov     bx,_TEXT : int1C_seg            ; Obtain Segment of Original INT 1C
        mov     es:[1CH*4],ax                   ; Install Old INT 1C Offset
        mov     es:[(1CH*4)+2],bx               ; Install Old INT 1C Segment
;       pop     ax                              ; Obtain Old 8259 IMR From Stack
;       out     021H,al                         ; Set-up Old 8259 IMR
        pop     es                              ; Restore ES Register
        pop     bx                              ; Restore BX Register
        pop     ax                              ; Restore AX Register
        popf                                    ; Restore Flags Register
        ret                                     ; Return to Caller
_Timer_disable  endp
```

The _Timer-disable function above is responsible for restoring the system to its original state. In other words, the INT Ox08 and INT Ox1C interrupts are restored to seconds (512 times 32 microseconds) because the FDC has half of the amount of data to store in the same rotational time frame (typically 360 RPM).

The following code fragment illustrates the _Timer_isr routine:

```
PROCEDURE:  _Timer_isr
REMARKS:    _Timer_isr is responsible for receiving the INT 8 timer interrupts from the 8253.
            Since the 8253 has been programmed to interrupt approximately 128 times
```

-continued

```
            faster _Timer_isr must call the old INT 8 ISR routine every 128th interrupt.
            _Timer_isr is also responsible for initiating a DMA
            request on every timer interrupt.
_Timer_isr proc
        inc     _TEXT : ticks               ; Increment the Interrupt Tick Counter
        cmp     _TEXT : active, 0FFH        ; Check to see if Diskette Write Op
        jz      begin_isr                   ; If so, Then Begin Timer ISR
        jmp     chk_old                     ; Otherwise, Check if Old ISR Runs
begin_isr:
        cld                                 ; Clear the Direction Flag
        mov     _TEXT : AX_reg,ax           ; Save AX Register
        mov     _TEXT : BX_reg,bx           ; Save BX Register
        mov     _TEXT : CX_reg,cx           ; Save CX Register
        mov     _TEXT : DX_reg,dx           ; Save DX Register
        mov     _TEXT : SI_reg,si           ; Save SI Register
        out     0CH,al                      ; Clear the Byte Pointer Flip/Flop
        cmp     _TEXT : CHN1_flag,0         ; Should Channel 1 Be Masked (Diabl)
        jz      bypass_CHN1                 ; If Zero, Then Don't Mask Channel
mask_CHN1:
        mov     al,005H                     ; DMA Mask Register Value
        out     00AH,al                     ; Disable DMA Channels (1 for Now)
        jmp     $+2                         ; (Can't Disable Refresh on XT - CH
bypass_CHN1:
;       in      al,020H                     ; Obtain 8259 Interrupt Mask Register
;       push    ax                          ; Save 8259 IMR for Restoration
;       mov     al,0BDH                     ; Disable all but KBD and Diskette
;       out     021H,al                     ; Set-up New 8259 IMR
        in      al,08H                      ; Obtain 8237 DMA Status
        test    al,04H                      ; Check for Channel 2 DMA TC
        je      chk_change                  ; If no TC, Then Check for DMA Req
        jmp     exiting                     ; Otherwise, Exit Routine
chk_change:
        in      al,05H
        mov     dl,al
        in      al,05H
        mov     dh,al
        mov     cx,_TEXT : ratio
chk_change_A:
        in      al,05H
        mov     bl,al
        in      al,05H
        mov     bh,al
        cmp     bx,dx
        jne     chk_count
        in      al,05H
        mov     bl,al
        in      al,05H
        mov     bh,al
        cmp     bx,dx
        jne     chk_count
        loop    chk_change_A                ; Loop if Processor is Fast
        jmp     exiting                     ; If not DRQ, Exit Routine
chk_count:
        mov     si,bx                       ; Save Current DMA Count
        and     si,01FFH                    ; Isolate Lower Sector Count
        shl     si,1                        ; Word Normalize SI Value
        jmp     _TEXT : DMA_Count_TBL[SI]   ; Shadow the DMA Transfers Via S/W
```

The foregoing _Timer_isr routine performs some sanity checks on the system to determine if the system is actually transferring data to the FDC. If a sector transfer is not in progress then _Timer_isr exits immediately. However, if a sector transfer is in progress then _Timer_isr obtains the remaining byte count of the sector transfer and vectors (jumps) through the software decoding network (DMA_Count_TBL) to the appropriate processing routine.

Although the system and method depicted in FIG. 4, could be implemented as is, it would require the timer to interrupt every 8, 16, or 32 microseconds. This level of interrupts would totally consume a PC's processing power, and on a PC/XT would/could not be sustained. Thus, in order to perform DMA shadowing without affecting the total system performance it is necessary to allow normal operations to continue as usual, but have an interrupt (the system clock) that will interrupt close to the end of the sector transfer so that the DREQ to DACK timing can be determined on the last byte of the sector transfer.

Clearly, it is possible to DMA shadow all 512 bytes during a sector transfer, but that would cause the CPU to be totally consumed during the entire sector transfer time. In other words, the potential of losing processing activities somewhere else in the system are greatly increased, such as in the case of serial communications. Therefore, the following clock interrupt strategy was developed to reduce the CPU involvement to a bare minimum during the floppy write operations with DMA Shadowing. Significantly, the timing strategy can be adjusted to any number of bytes of the sector transfer, from a few bytes to the entire sector count.

As indicated above, the last operation performed in the _Timer_isr routine is to vector through the software decoding network to the appropriate processing routine. This process is illustrated graphically in FIG. 5. The software decoding network (software vector-table)

has one code point/entry for each possible transfer byte in the sector. The timer interrupt rate can now be in

| | DMA_Count_TBL | | |
|---|---|---|---|
| | LABLE | WORD | |
| | DW | OFFSET DMA_0 | ; Entry for DMA Count 0 |
| | DW | OFFSET DMA_1 | ; Entry for DMA Count 1 |
| | DW | OFFSET DMA_2 | ; Entry for DMA Count 2 |
| | DW | OFFSET DMA_3 | ; Entry for DMA Count 3 |
| | DW | OFFSET DMA_4 | ; Entry for DMA Count 4 |
| | DW | OFFSET DMA_5 | ; Entry for DMA Count 5 |
| | DW | OFFSET DMA_6 | ; Entry for DMA Count 6 |
| | DW | OFFSET DMA_7 | ; Entry for DMA Count 7 |
| | DW | OFFSET DMA_8 | ; Entry for DMA Count 8 |
| | DW | OFFSET DMA_9 | ; Entry for DMA Count 9 |
| | DW | OFFSET DMA_a | ; Entry for DMA Count a |
| | DW | OFFSET DMA_b | ; Entry for DMA Count b |
| | DW | OFFSET DMA_c | ; Entry for DMA Count c |
| | DW | OFFSET DMA_d | ; Entry for DMA Count d |
| | DW | OFFSET DMA_e | ; Entry for DMA Count e |
| | DW | OFFSET DMA_f | ; Entry for DMA Count f |
| | DW | OFFSET DMA_10 | ; Entry for DMA Count 10 |
| | DW | OFFSET DMA_11 | ; Entry for DMA Count 11 |
| | DW | OFFSET DMA_12 | ; Entry for DMA Count 12 |
| | DW | OFFSET DMA_13 | ; Entry for DMA Count 13 |
| | DW | OFFSET DMA_14 | ; Entry for DMA Count 14 |
| | DW | OFFSET DMA_15 | ; Entry for DMA Count 15 |
| | DW | OFFSET DMA_16 | ; Entry for DMA Count 16 |
| | DW | OFFSET DMA_17 | ; Entry for DMA Count 17 |
| | DW | OFFSET DMA_18 | ; Entry for DMA Count 18 |
| | DW | OFFSET DMA_19 | ; Entry for DMA Count 19 |
| | DW | OFFSET DMA_1a | ; Entry for DMA Count 1a |
| | DW | OFFSET DMA_1b | ; Entry for DMA Count 1b |
| | DW | OFFSET DMA_1c | ; Entry for DMA Count 1c |
| | DW | OFFSET DMA_1d | ; Entry for DMA Count 1d |
| | DW | OFFSET DMA_1e | ; Entry for DMA Count 1e |
| | DW | OFFSET DMA_1f | ; Entry for DMA Count 1f |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code |
| | DW | OFFSET exiting | ; Address Of Exit Code | terms of 10's or 100's of byte transfer times because the vector table will cause the program execution to enter a cascade of DREQ/DACK checks only when it knows that the transfer (sector) will be complete prior to another timer interrupt. In short, the first X entries in the vector table will simply return (knowing that another timer interrupt will occur before the sector transfer completes). The latter Y entries will cascade from one DREQ/DACK detection to another (shadowing the DMA transfers) until the last byte is transferred. On the last byte being transferred, an instruction loop is counted and finally converted into microseconds to determine if the error has occurred.

This process is the fastest known technique for decoding and executing time-dependent situations. Memory space (the software decoding network vector table) is traded for processing time (the amount of time it would take for one routine to subsume all functionality encoded in each of the routines vectored to through the software decoding network vector table).

The following code fragment depicts a portion of the software decoding network employed in the DMA shadowing process of the presently preferred embodiment of the system and method of the present invention:

As indicated above, the entire software decoding network table is initially set to the address of the "exiting routine." Then depending upon how slow or fast the system clock interrupts a certain number of the lower-indexed entries of the table are set to the address of a processing routine. These processing routines are identical and are sequentially located in the routine so that the software decoding network vector table simply vectors the timer interrupt routine to the first of n sequentially executed processing routines where n represents the number of bytes remaining in the sector transfer. In this way the last few bytes of the sector transfer can be accurately monitored (DMA Shadowing) without significantly affecting overall system performance.

Each of the processing routines, except the last one, performs exactly the same function as indicated below:

```
DMA_1f:
        mov     dx,bx
        mov     cx,5
DMA_1f_A:
```

-continued

```
                in      al,05H
                mov     bl,al
                in      al,05H
                mov     bh,al
                cmp     bx,dx
                jne     DMA_1e
                in      al,05H
                mov     bl,al
                in      al,05H
                mov     bh,al
                cmp     bx,dx
                jne     DMA_1e
                loop    DMA_1f_A
DMA_1e:
                mov     dx,bx
                mov     cx,5
DMA_1e_A:
                in      al,05H
                mov     bl,al
                in      al,05H
                mov     bh,al
                cmp     bx,dx
                jne     DMA_1d
                in      al,05H
                mov     bl,al
                in      al,05H
                mov     bh,al
                cmp     bx,dx
                jne     DMA_1d
                loop    DMA_1e_A
```

The above routines represent the code required to completely monitor (shadow) the DMA process by watching the DREQ and DACK signal through the DMA controller. In other words, by watching the DMA controller's register that indicates when a DMA request is active (DREQ) then it is possible to completely monitor the sector transfer. It is not necessary to concern ourselves with the timing between the DREQ and DACK signals until the very last data byte of the transfer. Therefore, the routines above simply "shadow" the DMA process until the last byte at which time it is necessary to invoke the error detection and recovery procedure. When the DMA controller transfer register contains a value of 16 or less then the CPU begins to execute inline code that watches each data byte transfer in terms of signal requests and acknowledgements.

Once the last byte to be transferred has been identified then the DMA_O routine begins the process of determining the actual time taken between the DMA Request (DREQ) and the FDC's DMA Acknowledgement (DACK). This process is presented below:

```
DMA_0
                mov     cx,_TEXT : ratio        ; Up to 32 usec Before DREQ
                shl     cx,1
                shl     cx,1
DMA_DRQ_LO:
                in      al,08H                  ; Read DMA Status Register
                test    al,40H                  ; Is DRQ Active?
                jne     DMA_DRQ_HI              ; If Non-Zero, Then DRQ is Active
                loop    DMA_DRQ_LO              ; Otherwise, Continue Checking
                jmp     exiting                 ; DRQ Not Active so Exit
DMA_DRQ_HI:
                mov     cx,0FFFFH               ; Load Maximum Loop Count
DMA_DRQ_ACTIVE:
                in      al,08H                  ; Read DMA Status Register
                test    al,04H                  ; Is DRQ Active?
                je      DMA_DRQ_INACTIVE        ; If Zero, Then DRQ is Inactive
                loop    DMA_DRQ_ACTIVE          ; Otherwise, Continues Active
                jmp     exiting                 ; DRQ Stuck High (Terrible Error)
DMA_DRQ_INACTIVE:
                cmp     cx,0FFFFH               ; Check to See if DREQ Remained Active
                jne     DMA_TIME_ACTIVE         ; If so, Then Compute Time Active
                jmp     exiting                 ; Otherwise, Exit Normally
DMA_TIME_ACTIVE:
                mov     ax,_TEXT : avg          ; Load AX With Average 1 Loop Time
                not     cx                      ; Convert Count Down Value To
                                                ; Times Through The Active Loop
                                                ; (Value Used for "n" in Equation)
                inc     cx                      ; Account for First Time Through Loop
                mul     cl                      ; Compute (n * AVG)
                mov     _TEXT : time_active,ax  ; Computed Time Active (ticks)
                cmp     ax,14                   ; Compare with 12 usec Specification
                ja      DMA_error               ; If TA > 12usec, Then Issue Error
                jmp     exiting                 ; Otherwise, Continue Normal Operation
DMA_error:
                mov     _TEXT : errors, 0FFH    ; Set Error Flag to Indicate the Error
                jmp     exiting                 ; DRQ Not Active so Exit
exiting:
;               pop     ax                      ; Obtain Old 8259 IMR From Stack
;               out     021H,al                 ; Set up Old 8259 IMR
                cmp     _TEXT : CHN1_flag,0     ; Is Channel 1 Disabled?
                jz      not_CHN1                ; If 0, Then not Disabled
                                                ; Otherwise, Must Be Enable
                mov     al,01                   ; DMA Channel 1 Enable Pattern
                out     0AH,al                  ; Enable DMA Channel 1
not_CHN1:
                mov     si,_TEXT : SI_reg       ; Restore SI Register
                mov     dx,_TEXT : DX_reg       ; Restore DX Register
                mov     cx,_TEXT : CX_reg       ; Restore CX Register
                mov     bx,_TEXT : BX_reg       ; Restore BX Register
                mov     ax,_TEXT : AX_reg       ; Restore AX Register
```

-continued

```
chk_old:
        cmp     _TEXT : ticks,128      ; Check to See if Old INT 8 is Needed
        jb      send_EOI               ; If not Equal, Then Exit Timer ISR
        mov     _TEXT : ticks,0        ; Otherwise, Zero Total Tick Count
        jmp     _TEXT : int8_ptr       ; And Calling Old INT 8 Routine
send_EOI:
        push    ax                     ; Save AX Register
        mov     al,020H                ; 8259 End of Interrupt (EOI)
        out     020H,al                ; Send EOI to 8259
        pop     ax                     ; Restore Ax Register
timer_exit:
        iret                           ; Return from Interrupt
_Timer_isr endp
```

The actual process is similar to the previous routines, however there is a counter that is initialized which represents the time required to perform the code presented above. If this counter expires (counts down to zero) and the transition has not occurred (DREQ to DACK) then the DMA operation is aborted and an error condition is returned which will cause the operation to be retried by the operating system. Furthermore, since the DMA operation was terminated then the adjacent sector is not in danger of being corrupted by the operation.

Thus, through software DMA shadowing, it is possible to determine when the last byte of the transfer is about to be transferred. Therefore, it is possible to disable any hardware and/or software resource that is present in the system that can cause the last data byte's transfer to be delayed. The use of software DMA shadowing accordingly allows system software and device drivers to be used to create a critical region about the last data byte transfer that will ensure that the byte is transferred correctly (and not delayed).

The invention described herein provides a complete software implementation of a device driver that is capable of detecting an undetectable data corruption problem without hardware redesign and/or internal modification to an existing FDC. Furthermore, the unique and innovative approach taken which consists of DMA shadowing and use of a software decoding network allows the implementation of the invention to be small (approximately 3.5 kilobytes in a PC/MS-DOS environment) and only marginally degrade performance (<10%) and only during floppy write operations.

The number of FDCs installed in computer systems today is well over 20 million. In order to solve this problem the vendors of such devices have very few alternatives, of which most are extremely costly. Therefore, a software-only solution to this problem is a significant advance in the computer industry. Moreover, the robustness of the design allows the system and method of the present invention to dynamically adjust to processor speeds that encompass the original IBM Personal Computers executing at 4.77 Mhz to the latest workstations that execute at well over 50 MHz.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for detecting and preventing floppy diskette controller data transfer errors in computer systems having:
   a central processing unit (CPU);
   a system interrupt timer;
   a floppy diskette, the floppy diskette having at least one sector for receiving multiple data bytes;
   a floppy diskette controller (FDC) for controlling the transfer of data to the floppy diskette;
   means associated with the FDC for providing a data request (DREQ) signal and a data acknowledge (DACK) signal, the DREQ signal being provided when data transfer is requested and the DACK signal being provided when data transfer is permitted; and
   means for counting data bytes transferred to the floppy diskette, said counting means providing a data transfer byte count,
   the method comprising the steps of:
   determining if a requested computer system operation is a floppy diskette write operation;
   reading the data transfer byte count provided by said counting means;
   monitoring data byte transfers to the floppy diskette so as to determine when a last data byte is being transferred to a sector of the floppy diskette;
   measuring time between the data request (DREQ) and data acknowledge (DACK) signals for said last data byte transfer to a sector of the floppy diskette; and
   forcing an error condition if the measured time between said DREQ and DACK signals exceeds a specified value.

2. A method for detecting and preventing floppy diskette controller data transfer errors in computer systems having:
   a central processing unit (CPU);
   a system interrupt timer;
   a floppy diskette, the floppy diskette having at least one sector for receiving multiple data bytes;
   a floppy diskette controller (FDC) for controlling the transfer of data to the floppy diskette;
   means associated with the FDC for providing a data request (DREQ) signal and a data acknowledge (DACK) signal, the DREQ signal being provided when data transfer is requested and the DACK signal being provided when data transfer is permitted; and
   means for counting data bytes transferred to the floppy diskette, said counting means providing a data transfer byte count,
   the method comprising the steps of:
   determining if a requested computer system operation is a floppy diskette write operation;

hooking an interrupt vector and directing it to an interposer routine;

reprogramming the system interrupt timer to interrupt faster than normal;

installing and calling a software decoding network call vector;

reading the data transfer byte count provided by said counting means;

monitoring data byte transfers to the floppy diskette so as to determine when a last data byte is being transferred to a sector of the floppy diskette;

measuring time between the data request (DREQ) and data acknowledge (DACK) signals for said last data byte transfer to a sector of the floppy diskette;

forcing an error condition if the measured time between said DREQ and DACK signals exceeds a specified value;

reprogramming the system interrupt timer to interrupt normally; and unhooking said interrupt vector.

3. A method for detecting and preventing floppy diskette controller data transfer errors as defined in claim 1 wherein said means for counting data bytes comprises a data transfer count register of a direct memory access (DMA) controller and wherein the reading step comprises reading the DMA controller's data transfer count register.

4. A method for detecting and preventing floppy diskette controller data transfer errors as defined in claim 1 further comprising the step of hooking an interrupt vector and directing it to an interposer routine.

5. A method for detecting and preventing floppy diskette controller data transfer errors as defined in claim 1 further comprising the step of reprogramming the system interrupt timer to interrupt faster than normal.

6. A method for detecting and preventing floppy diskette controller data transfer errors as defined in claim further comprising the step of installing and calling a software decoding network call vector.

7. A method for detecting and preventing floppy diskette controller data transfer errors as defined in claim 2 wherein said means for counting data bytes comprises a data transfer count register of a direct memory access (DMA) controller and wherein the reading step comprises reading the DMA controller's data transfer count register.

* * * * *

UNITED STATES PATENT AND TRADEMARK OFFICE
CERTIFICATE OF CORRECTION

PATENT NO. : 5,379,414
DATED : January 3, 1995
INVENTOR(S) : Phillip M. Adams

It is certified that error appears in the above-identified patent and that said Letters Patent is hereby corrected as shown below:

In column 10, line 34, after "Remarks:", please delete "Timer enable", and insert therefor -- _Timer_enable --.

In column 11, line 18, please delete "cloak", and insert therefor -- clock --.

In column 12, line 20, please delete "Sector" and insert therefor -- sector --.

In column 22, line 15, after "claim", please insert -- 1 --.

Signed and Sealed this

Twenty-third Day of May, 1995

Attest:

BRUCE LEHMAN

*Attesting Officer*  *Commissioner of Patents and Trademarks*